UNITED STATES PATENT OFFICE.

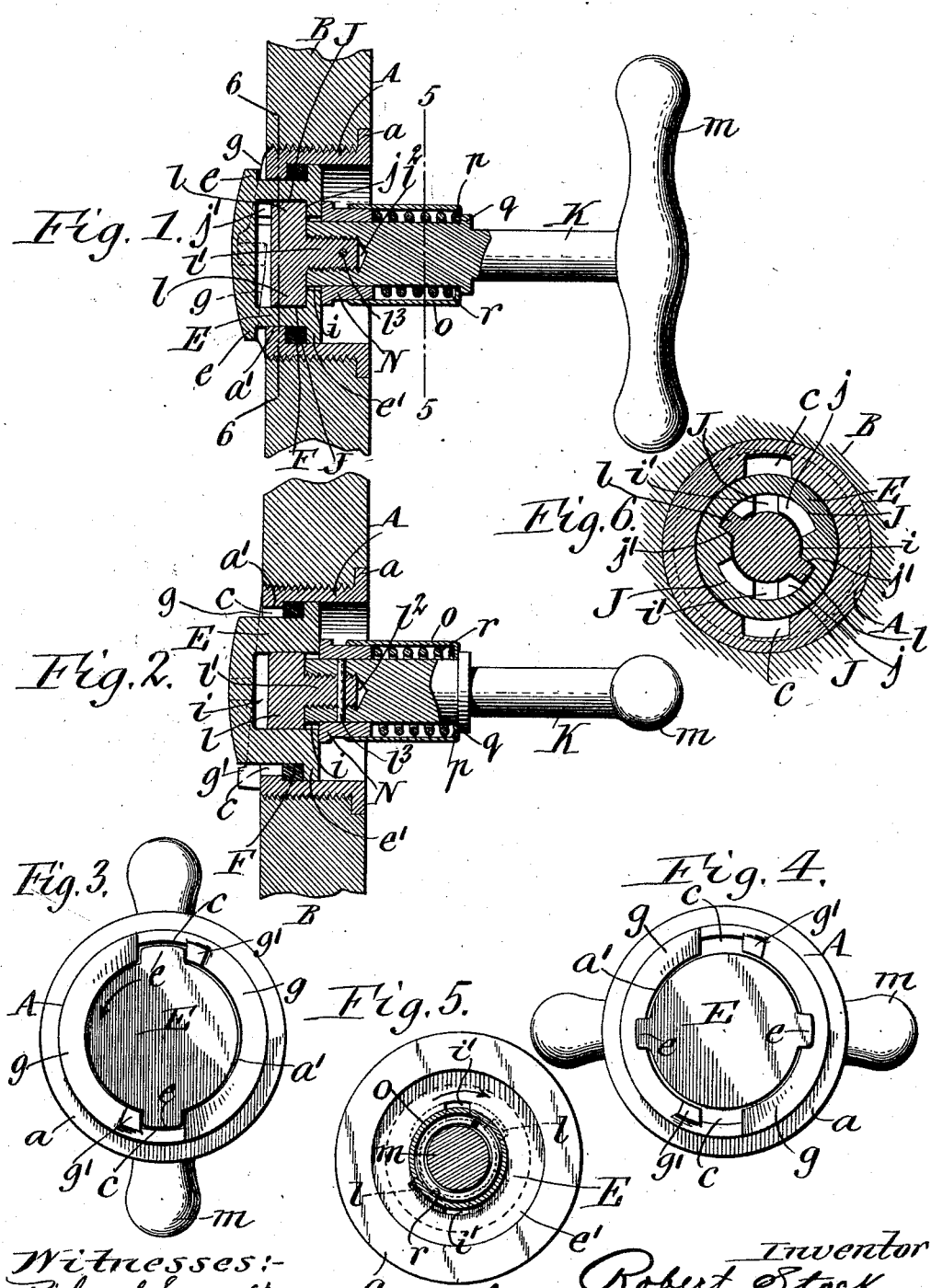

ROBERT STOCK, OF BUFFALO, NEW YORK, ASSIGNOR TO ROBERT STOCK MANUFACTURING COMPANY, OF BUFFALO, NEW YORK, A CORPORATION OF NEW YORK.

BUNG-KEY.

1,006,144.   Specification of Letters Patent.   Patented Oct. 17, 1911.

Application filed March 7, 1910. Serial No. 547,675.

*To all whom it may concern:*

Be it known that I, ROBERT STOCK, a citizen of the United States, residing at Buffalo, in the county of Erie and State of New York, have invented new and useful Improvements in Bung-Keys, of which the following is a specification.

This invention relates to an improved key for manipulating the bungs of beer barrel bushings.

The keys for operating the bungs of beer barrel bushings have heretofore usually been so constructed that upon withdrawing the key from the bung after the latter has been tightened in the bushing, the bung would often be loosened owing to the excessive friction between the handle and the bung which is produced by the wedge action of the coöperating surfaces of the bung. Such partial loosening of the bung is objectionable for the reason that it results in leakage.

In practice it is desirable to retain the key and bung in a connected or interlocked condition inasmuch as the introduction and removal of the bung can by this means be effected by one hand without the liability of the bung dropping from the key, leaving the other hand of the operator free for other work.

It is the object of this invention to provide a key for bungs which permits of reliably and securely connecting the key and the bung while manipulating the latter but which permits of easily detaching the key from the bung when this is required.

In the accompanying drawings: Figure 1 is a longitudinal section showing my improved key applied to a beer barrel bung. Fig. 2 is a longitudinal section taken at right angles to Fig. 1, Fig. 3 is a face view of the bushing and bung from the inner end thereof showing the position of the bung relatively to the bushing when the same is passed into and out of the bushing. Fig. 4 is a similar view showing the position of the bushing and bung when these parts are interlocked. Figs. 5 and 6 are cross sections in lines 5—5 and 6—6, Fig. 1, respectively.

Similar letters of reference indicate corresponding parts throughout the several views.

A represents a hollow circular bushing which is screwed by means of a thread on its periphery into an opening in the barrel B and which is provided at its outer end with an external flange $a$ bearing against the outer side of the barrel and at its inner end with an internal annular flange $a'$. On diametrically opposite sides the internal flange of the bushing is provided with notches $c$, $c$ extending from the bore of this flange but stopping short of the bore of the bushing.

E represents a circular bung adapted to coöperate with the bushing and provided on diametrically opposite sides of its inner end with laterally projecting locking lugs or wings $e$, $e$ and at its outer end with an annular flange $e'$.

F represents a washer or packing ring of rubber or other elastic material arranged on the periphery of the bung and bearing against the inner side of its external flange. In applying this bung to the bushing the same is passed inwardly through the bushing while its lugs $e$ are in line with the notches of the bushing, so that the lugs pass through the notches $c$ until said lugs are arranged beyond the inner side of the bushing and the packing ring F bears with its inner side against the outer side of the internal flange $a'$ of the bushing. After the bung has been thus introduced into the bushing the same is turned in the direction of the arrow, Fig. 3, whereby the lugs of the bung are caused to rise upon inclined faces $g$ formed on the inner end of the bushing and thereby move the bung inwardly and compress the packing ring between the flanges $a'$, $e'$ of the bung and bushing for forming a tight closure between these parts. The bung is prevented from being turned in the wrong direction after being passed inwardly through the bushing by means of a pair of stop lugs $g'$ which are arranged on those sides of the notches opposite the lower ends of the inclines.

My improved key for holding the bung while introducing or removing the same from the bushing and while tightening or loosening the same in the bushing and those parts of the bung which are adapted to receive this handle or key are constructed as follows:—Centrally on its outer side the bung is provided with a key seat or socket composed of a comparatively large central cylindrical part $i$ and two narrow side parts $i'$ radiating from opposite sides of the central part $i$. On opposite sides of each narrow part of the key seat, the bung is provided with undercut locking recesses J forming inwardly facing shoulders $j$ on the outer sides of said recesses and abutments $j'$ at the back thereof, as shown in Figs. 1, 5 and 6.

K represents the shank or body of the bung operating and holding key which is preferably of cylindrical form and provided on opposite sides of its inner or front end with laterally projecting wings or lugs $l, l$ while its outer or rear end is provided with a transverse handle or finger piece $m$. Upon placing the key with its shank in line with the central wide part of the socket and its wings in line with the narrow side parts thereof and then moving the key forward the shank and wings will pass into the socket. Upon now turning the key in the direction of the arrow, Fig. 5, its wings will be carried into the respective undercut recesses and engage with the backs $j'$ thereof, thereby causing the bung to be turned and its lugs $e, e$ to become interlocked with the inclines $g$ of the bushing. For detaching the bung the key is turned in the opposite direction, so that its wings enter the opposite recess of the socket and engage with the backs of the same.

The thickness of the wings lengthwise of the axis of the key is less than the depth of the socket of the bung, so that the wings do not bind in the recesses of the socket upon turning the key in the socket either when tightening or loosening the bung, thereby preventing the wings from becoming pinched or wedged so tightly in the socket as would be liable to cause loosening of the bung upon retracting the key after the bung is closed and also prevent easy detachment of the key from the bung. The shank and finger piece of the key are preferably formed in one piece but the wings are made separate therefrom and connected therewith by an externally screw threaded stud $l'$ arranged on the outerside of the central part of the wings or lugs and engaging with an internally screw threaded socket $l^2$ in the inner end of the shank, and across pin $l^3$ extending through the shank and stud, as shown in Figs. 1 and 2.

In order to permit the wings of the key to thus loosely engage the recesses of the socket and still permit of reliably holding the bung on the key so that these parts will remain assembled and permit of manipulation thereof by one hand, a yielding pressure or gripping device is provided which preferably consists of a friction member or pressure sleeve N slidable on the inner or front part of the shank, a tubular casing $o$ surrounding the shank and having its inner or front end overlapping the outer end of the pressure sleeve so as to form a telescopic joint therewith, an internal flange $p$ arranged at the outer end of the casing and engaging with an inwardly facing shoulder $q$ on the outer part of the shank, and a spring $r$ surrounding said shank and bearing at its inner or front end against the pressure sleeve while its outer or rear end bears against the internal flange $p$ of the casing. By this means the bearing or pressure sleeve is yieldingly held in its foremost position, the movement of the pressure sleeve in this direction being limited by the coupling lugs or wings $l, l$ which serve as stops for this purpose.

Upon inserting the key into the socket of the bung the pressure sleeve by engaging with the outer side of the bung is retracted on the shank of the key which increases the strain or tension on the spring $r$, so that upon turning the key and engaging its wings with a pair of the locking recesses, these wings will be held frictionally by spring pressure on their inner sides against the outer sides $j$ of the recesses. This pressure is sufficiently great to hold the bung reliably on the key, so that it will not drop off during the ordinary handling of the same by the operator in applying the bung to or removing the same from the bushing and also to permit of easily connecting and disconnecting the key and bung. This pressure is, however, sufficiently light to permit the key to be turned backwardly after the bung has been tightened in the bushing without causing the latter to turn backwardly with the key, thereby avoiding loosening of the bung and consequent leakage.

I claim as my invention:

1. A bung key having a shank provided with a laterally projecting wing adapted to engage with an undercut socket in a bung, and a yielding pressure device mounted on the key and adapted to be strained upon inserting said key into said socket, said pressure device comprising a tubular friction member guided on said shank and adapted to engage its inner end with the outer side of said bung, and a spring mounted on said key adjacent to said friction member and operating to hold the latter yieldingly in its projected position.

2. A bung key having a shank provided with a laterally projecting wing adapted to engage with an undercut socket in a bung, and a yielding pressure device mounted on the key and adapted to be strained upon inserting said key into said socket, said pressure device comprising a sleeve guided on said shank and adapted to engage at its inner end with the outer side of said bung, a tubular casing surrounding the shank and extending at its inner end over said sleeve and provided at its outer end with an internal flange which engages with a shoulder on said shank, and a spring surrounding said shank and bearing at its inner end against said sleeve and at its outer end against said flange of the casing.

Witness my hand this 23rd day of February, 1910.

ROBERT STOCK.

Witnesses:
 THEO. L. POPP,
 ANNA HEIGIS.

Copies of this patent may be obtained for five cents each, by addressing the "Commissioner of Patents, Washington, D. C."